UNITED STATES PATENT OFFICE.

EDUARD MARBURG AND GUSTAV MÜNCH, OF GRIESHEIM-ON-THE-MAIN, GERMANY, ASSIGNORS TO CHEMISCHE FABRIK GRIESHEIM-ELEKTRON, OF FRANKFORT-ON-THE-MAIN, GERMANY, A CORPORATION OF GERMANY.

PRODUCTION OF ANHYDROUS HYDROSULFITES FROM AQUEOUS HYDROSULFITE SOLUTIONS.

1,207,782.     Specification of Letters Patent.     Patented Dec. 12, 1916.

No Drawing.     Application filed June 9, 1914. Serial No. 844,026.

*To all whom it may concern:*

Be it known that we, EDUARD MARBURG and GUSTAV MÜNCH, both subjects of the German Emperor, and residents of Griesheim-on-the-Main, Germany, have invented certain new and useful Improvements in the Production of Anhydrous Hydrosulfites from Aqueous Hydrosulfite Solutions, of which the following is a specification.

In the specification of U. S. Patent 1,156,107, dated October 12, 1915, a process is described which has for its object the production of anhydrous hydrosulfites by the evaporation to dryness of their aqueous solutions *in vacuo* and in the presence of anilin or other organic bases. When the process is carried out in the manner described in the specification of the said patent, the hydrosulfite is obtained in the form of a fine powder.

According to the present invention, which is an improvement upon the process described in said patent, and in contradistinction thereto, the salt is obtained in a fine-grained, dense and stable form, by so carrying out the process that the last part of water can be removed at a temperature of about from 60° to 65° centigrade. The process is for instance carried out in such a manner that the hydrosulfite solution mixed with anilin is evaporated in a high vacuum in the usual way at a low temperature (say for example, at from 30° to 35° centigrade), until the greater part of the water is removed. Thereupon the remaining part of the water is distilled off at from 60° to 65° centigrade in a suitable vacuum. The removal of the anilin still present is effected by further distillation in the manner described in the specification of the aforesaid prior patent.

The following example will further illustrate how the invention can be carried out, but the invention is not limited to this example: 100 liters of sodium hydrosulfite solution are mixed with 50 liters of anilin and evaporated almost to dryness in a good vacuum while being well stirred. After the greater part of the water has been distilled off, the remainder is driven off at from 60° to 65° centigrade at a pressure of from 180 to 80 millimeters of mercury and the anilin is then removed by further distillation. A sodium hydrosulfite remains of from 80 to 85 per cent. content, stable in the air and of a dense granular constitution.

The favorable action of the anilin is probably due to the property, viz. that anilin and water are soluble one in the other to a limited extent. Anilin has furthermore the property of forming emulsions readily and thoroughly both with aqueous solutions as well as with wet pulps of a salt. In this way a solid caking of the individual particles of salt is entirely avoided in the distillation of the water and in addition to this the protecting action of the base takes place at all times and in all parts of the mass.

In place of anilin, similarly acting stabilizing organic bases such as toluidins may be used.

Having now particularly described and ascertained the nature of our said invention and in what manner the same is to be performed, we declare that what we claim is:—

1. The process of removing from partly evaporated hydrosulfite solutions containing a suitable organic base, the amount of which base is in excess of that removed by evaporation of the water of the solution, the last parts of water and producing anhydrous hydrosulfites in a stable form, which comprises distilling off the last parts of water at a temperature of about 60 to 65° C. under a suitable vacuum, and removing the organic base by further distillation.

2. The process of producing a high per cent. anhydrous hydrosulfite in stable form comprising subjecting to evaporation a mixture of an aqueous hydrosulfite solution and an organic base, the amount of said base being in excess of that which is removed by the evaporation of the water of the solution, distilling off the last parts of water at a temperature of about 60 to 65° C. under a suitable vacuum, and removing the said base.

3. The process of producing a high per cent. anhydrous hydrosulfite in stable form comprising subjecting to evaporation a mixture of an aqueous hydrosulfite solution and anilin, the amount of anilin employed being such that it is present as a free base after the water of the solution is evaporated, distilling off the last parts of water at a temperature of about 60 to 65° C. under a suitable vacuum, and removing the anilin.

4. The process of producing anhydrous hydrosulfites in a stable form, which comprises mixing with an aqueous hydrosulfite solution an organic base, the amount of said base being in excess of that which is removed by the evaporation of the water of the solution, evaporating said mixture until the greater part of the water has been removed, distilling off the remainder of the water at a temperature of about 60 to 65° C. under a suitable vacuum, and removing the organic base by further distillation.

5. The process of producing anhydrous hydrosulfites in a stable form, which comprises mixing with an aqueous hydrosulfite solution anilin, the amount of anilin being in excess of that which is removed by the evaporation of the water of the solution, evaporating said mixture until the greater part of the water has been removed, distilling off the remainder of the water at a temperature of about 60 to 65° C. under a suitable vacuum, and removing the anilin by further distillation.

6. The process of producing anhydrous hydrosulfites in a stable form, which comprises mixing with an aqueous hydrosulfite solution an organic base, the amount of said base being in excess of that which is removed by the evaporation of the water of the solution, evaporating said mixture while agitating it until the greater part of the water has been removed, distilling off the remainder of the water at a temperature of about 60 to 65° C. under a suitable vacuum, and removing the organic base by further distillation.

7. The process of producing anhydrous hydrosulfites in a stable form, which comprises mixing with an aqueous hydrosulfite solution anilin, the amount of anilin being in excess of that which is removed by the evaporation of the water of the solution, evaporating said mixture while agitating it until the greater part of the water has been removed, distilling off the remainder of the water at a temperature of about 60 to 65° C. under a suitable vacuum, and removing the anilin by further distillation.

In testimony whereof we have signed our names to this specification in the presence of two subscribing witnesses.

EDUARD MARBURG.
GUSTAV MÜNCH.

Witnesses:
    JEAN GRUND,
    CARL GRUND.